United States Patent [19]

Stevens

[11] Patent Number: 4,552,380

[45] Date of Patent: Nov. 12, 1985

[54] SELF-CONTAINED CRASH BAG AND INITIATOR

[75] Inventor: George L. Stevens, Ogden, Utah

[73] Assignee: Morton Thiokol, Inc., Chicago, Ill.

[21] Appl. No.: 569,861

[22] Filed: Jan. 11, 1984

[51] Int. Cl.$^4$ ............................................. B60R 21/08
[52] U.S. Cl. .................................... 280/728; 280/731; 280/732; 280/734
[58] Field of Search ................ 280/734, 731, 728, 732

[56] References Cited

U.S. PATENT DOCUMENTS

| | | | |
|---|---|---|---|
| 3,907,330 | 9/1975 | Kondo et al. | 280/734 |
| 3,944,251 | 3/1976 | Lynch | 280/731 |
| 4,101,146 | 7/1978 | Oehm | 280/731 |
| 4,167,276 | 9/1979 | Bell et al. | 280/731 |

Primary Examiner—Richard A. Bertsch
Attorney, Agent, or Firm—Gerald K. White

[57] ABSTRACT

A self-contained inflatable passive restraint system for passenger vehicles includes a support housing structure that provides support for the inflatable cushion or crash bag which is folded thereon when in an undeployed state and contains all of the components, including collision responsive sensor means, required for inflation of the crash bag responsively to the occurrence of a collision. A plastic cover over the support housing structure and crash bag provides an environmental seal therefor.

4 Claims, 4 Drawing Figures

SELF-CONTAINED CRASH BAG AND INITIATOR

BACKGROUND OF THE INVENTION

1. Field of the Invention

The present invention relates to a self-contained inflatable restraint system for use in an automotive vehicle for restraining forward movement of a seated occupant during the critical instant of a collision impact.

2. Description of the Prior Art

Realizing that automotive vehicle crash restraint systems requiring positive effort on the part of the user for effectiveness have largely been ignored by the population intended to be protected, governmental safety programs have tended to emphasize automatic restraint systems, such as crash bags.

The details of crash bag systems have been widely discussed, as have the reasons for selection of pyrotechnic devices when dependable gas supplies for the rapid deployment of crash bags are required. The operational constraints of crash bags are also well known. The system must supply non-toxic gas to inflate the bag because the bag generally is vented into the passenger compartment on deflation and because of the possibility of bag rupture in an actual crash situation. The gas must inflate the bag at a temperature which the vehicle occupant to be protected can tolerate. The time period for attainment of maximum inflation has been determined to be from 20 to 100 milliseconds after actuation by a sensor assembly mounted on a forward portion of the vehicle separated from the pyrotechnic device and crash bag and operated in response to the occurrence of a collision. The apparatus comprising the system must be safe to handle and store prior to installation. It must be adaptable to mass production, lend itself to easy installation, and not introduce an unreasonable hazard at the time of such installation or during the life of the vehicle. Additionally, it must assure reliable operation during the life of the vehicle, which may be 10 years or more.

SUMMARY OF THE INVENTION

An object of the invention is to provide a vehicle inflatable restraint system that is self-contained.

Another object of the invention is to provide a vehicle inflatable restraint system, including an inflatable crash bag, wherein a support housing structure, that is characterized by its ease of installation in a vehicle, provides support for the crash bag, which is folded thereon when in an undeployed condition, and embodies therein all of the appartus components required for inflation of the crash bag responsively to the occurrence of a collision.

A more specific object of the invention is to provide such a vehicle inflatable restraint system wherein the support housing structure contains an inflator for inflating the crash bag and a sensor that is activated under predetermined conditions attendant a collision for activating the inflator.

A further specific object of the invention is to provide such a vehicle inflatable restraint system wherein sensor redundancy is provided to reduce the probability of failure to activate the inflator responsively to a collision.

Another specific object of the invention is to provide a vehicle restraint system that is characterized by the ease of installation thereof in the vehicle.

Other objects of the invention are to provide an inflator or gas generator suitable for inflating structures in the presence of vehicle occupants that has a very rapid response and is operative to deliver gases sufficiently cool so that there is no danger of burning the occupants of a vehicle. Important features of the invention are that the inflator is nonpropulsive; the gases are automatically diffused and cannot damage the inflatable restraint cushion or crash bag; the solid fuel of the pyrotechnic device is environmentally sealed, and hence, reliable after years of storage; and cooling and filtering means may be provided easily and inexpensively by annular wrappings of screen material. Additionally, the support housing structure is readily mountable on the steering column or instrument panel of an automotive vehicle; and the structure is simple and lends itself to mass production.

In accomplishing the foregoing and other objectives of the invention, there is provided an inflatable restraint system for an automotive vehicle including an inflatable crash bag and a support housing structure having a base that may be fixedly attached to the automotive vehicle and which contains all of the apparatus components required for inflation of the crash bag responsively to the occurrence of a collision, the crash bag when in an undeployed condition being folded over the support housing structure. A cover over the folded crash bag provides an environmental seal for the inflatable restraint system. The inflatable restraint system of the present invention thus is entirely self-contained, there being no connections by electrical wiring or other means to any external and/or collision responsive sensor, as in the prior art. As those skilled in the art will understand, this greatly facilitates installation of the inflatable restraint system in a vehicle the occupants of which are to be the beneficiary of the inflatable restraint system in the event of a collision of the vehicle.

The support housing structure comprises a cup-shaped member having a relatively thick annular wall that is integral therewith, and a flat base that is adapted to be fixedly attached, as by a suitable clamp, bolting, or a suitable adhesive, to the vehicle instrument panel or steering shaft. The internal surface of the annular wall defines a cylindrical space, a portion of that internal surface remote from the base being provided with a screw thread. First and second channels that are substantially perpendicular to the base are formed in the annular wall with one channel on one side of the annular wall and the other channel on the diametrically opposite side thereof. Both channels extend for the full length of the annular wall and each is connected to the cylindrical space formed by the annular wall by a respectively associated passageway in the base.

The support housing structure further comprises a cover member for the cup-shaped member. The cover member includes a first circular plate that extends over the end of the cup-shaped member remote from the base thereof, the portion of the first circular plate that closes off the end of the cylindrical space formed by the annular wall being perforated but the portions thereof closing off the ends of the diametrically positioned channels being imperforate. Integrally formed with the first circular plate is a cylindrical member having a first cylindrical portion that extends into the cylindrical space formed by the annular wall and an oppositely directed second cylindrical portion that extends away from that cylindrical space, the wall of the second cylindrical portion being perforated. The first cylindrical portion is provided with external threads which are adapted for mating engagement with the threads on the internal surface of the annular wall for fixedly attaching the cover member to the cup-shaped member with the cylindrical plate thereof in tight engagement with the annular end surface of the annular wall.

Fixedly attached to the annular end surface of the perforated second cylindrical portion of the cylindrical member, as by welding, is a second circular plate having a diameter of approximately the same size as that of the first circular plate forming therewith and with the second cylindrical portion an annular space that is positioned substantially parallel to the base of the support housing. A suitable heat sink screen desirably may be provided in this annular space for a purpose described hereinafter.

A crash bag or restraint cushion, when in the stored condition, is normally folded over the support housing structure with the inlet opening thereof secured to a peripheral flange portion of the base of the housing structure by a retaining ring. A plastic cover which may also be retained to the base of the support housing by the retaining ring is provided to press the folded crash bag against the outer surface portions of the support housing. The plastic cover, in addition to minimizing the space occupied by the inflatable restraint system in its undeployed state, may also serve to provide an environmental seal therefor. To that end a suitable adhesive may be provided to seal the plastic cover to the peripheral edge of the base.

Gas generant material in the form of pellets are contained within the cylindrical space formed by the annular wall of the cup-shaped member, being retained therein by the perforated first circular plate. While the gas generant material may be one of a number of compositions meeting the requirements for burning rate, nontoxicity and flame temperature, preferred materials are pellets made from mixtures of alkali metal azides, such as sodium azide, and other materials as disclosed in U.S. Pat. No. 4,203,787 granted on May 20, 1980 to George F. Kirchoff and Fred E. Schneiter, or pellets made from non-hydrogen containing tetrazole compounds as disclosed in U.S. Pat. No. 4,369,079 granted on Jan. 18, 1983 to Graham C. Shaw, or in U.S. Pat. No. 4,370,181 granted on Jan. 25, 1983 to Norman H. Lundstrum and Graham C. Shaw.

For activating or initiating combustion of the gas generant material, there is provided in each of the channels in the annular wall of the cup-shaped member a booster charge, for example, of boron potassium nitrate ($BKNO_3$) pellets, percussion responsive means comprising a stab primer or percussion cap, and a firing pin that is activated responsively to the occurrence of a collision. To that end each of the firing pins is normally held in a position separated from the primer by a pair of over-center helical springs.

In accordance with the invention, the base of the support housing structure is mounted, in any suitable manner, on the vehicle transverse to the direction of vehicle motion. With the base so positioned, the inflatable restraint system is initiated by the shock of a crash of the vehicle. The firing pins are inertial masses which are initially spring biased or loaded away from the primer until subjected to the deceleration accompanying a crash. The spring arrangement employed is an over-center type and as soon as sufficient deceleration is experienced for a finite time, the firing pin is actuated over-center toward the primer. At this point the spring arrangement assists the inertial forces to augment the energy of the firing pin as it strikes the primer. By the use of twin channels, each containing its individually associated booster material, primer and firing pin, the system is made redundant.

When the primer fires, the booster ignition charge is ignited which transfers the flame through the associated passageway in the base of the support housing to the main charge of solid propellant pellets in the cylindrical space in the support housing structure. The generated gases then pass through perforations in the first circular plate and are diffused radially in all directions through the perforated second cylindrical portion and through the heat sink screen wherein the gases are cooled and filtered before entering the crash bag area, a primary purpose of the heat sink screen being to cool down the generated gases from a flame temperature of the burning propellant of about 1400° F. to about 200° F. Thus, the radially diffused gases delivered to the crash bag are non-propulsive and are sufficiently cool so that there is no danger of causing burning of the occupants of the vehicle coming into contact with the surface of the crash bag as it is inflated.

BRIEF DESCRIPTION OF THE DRAWINGS

Having summarized the invention, a detailed description follows with reference being made to the accompanying drawings which form part of the specification, of which.

DESCRIPTION OF THE PREFERRED EMBODIMENT

Figure 1:
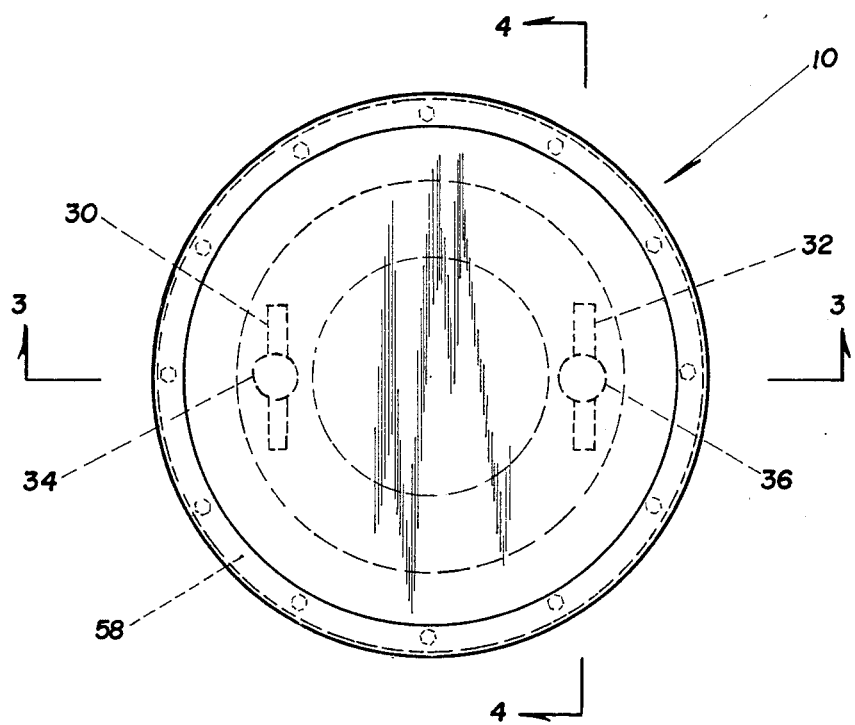
FIG. 1 is a top plan view of an illustrative embodiment of the invention comprising an inflatable restraint system which may be installed on the instrument panel of the vehicle, or if desired, the steering shaft thereof.
Figure 2:
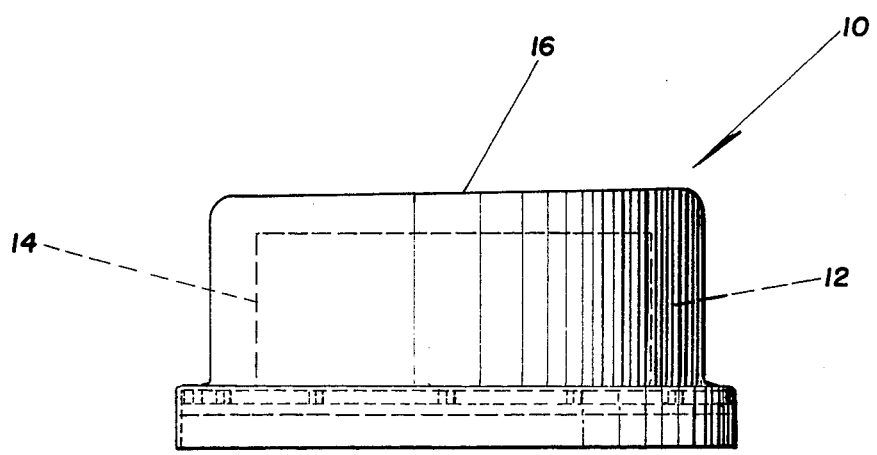
FIG. 2 is a side elevational view of the inflatable restraint system of FIG. 1.

Referring now to the drawings, wherein like numerals indicate like or corresponding parts throughout the several views, there is shown a self-contained inflatable restraint system 10 for an automotive vehicle. The inflatable restraint system 10 includes a restraint cushion or crash bag 12 and a support housing structure 14 on which the crash bag 12 is positioned when in a stored condition, being suitably folded thereon and retained in place by a plastic cover 16. The cover 16 presses the fabric of the crash bag 12 against the outer surface of the support housing 14 thereby minimizing the space normally occupied by the inflatable restraint system 10 in the vehicle and also serving to seal the system 10 against the environment.

Figure 3:
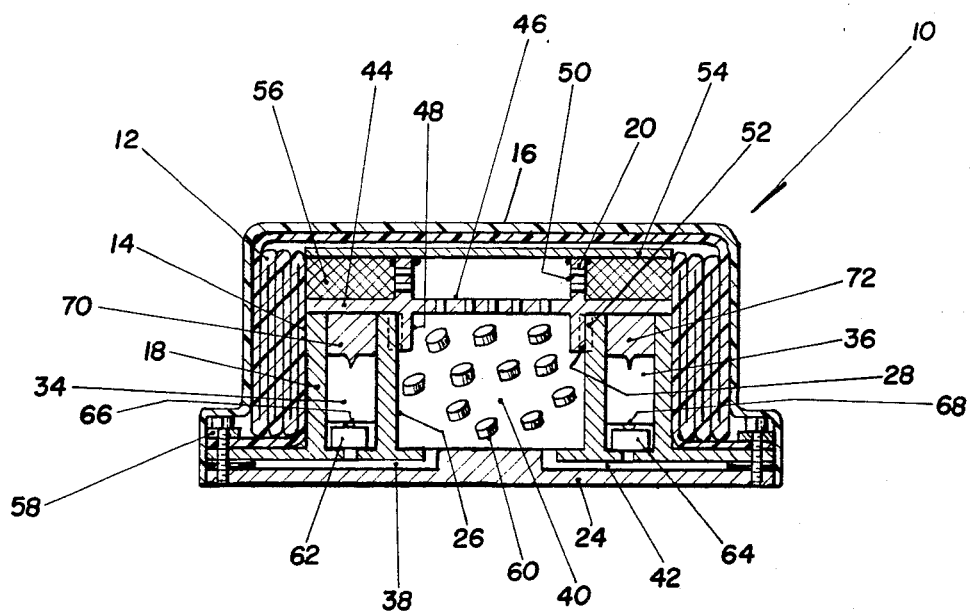
FIG. 3 is a cross-sectional view of the inflatable restraint system of FIG. 1 taken along the lines 3—3 thereof.
Figure 4:
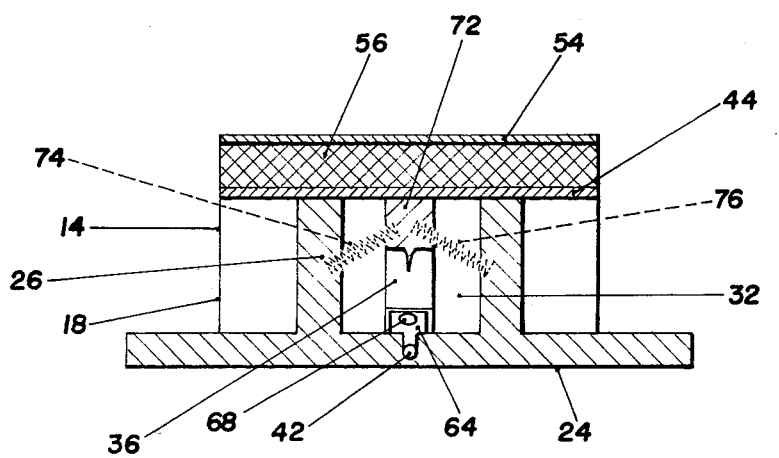
FIG. 4 is a cross-sectional view, with the crash bag and cover removed, of the inflatable restraint system of FIG. 1 taken along the lines 4—4 thereof.

The support housing structure 14, as best seen in FIGS. 3 and 4, includes a cup-shaped member 18, and an H-shaped cover member 20 for the cup-shaped member 18. The cup-shaped member 18 includes a flat base 24 and an annular wall 26 that is integral with the base 24, being disposed substantially perpendicularly with respect thereto. On a portion of the internal cylindrical surface of the annular wall 26 remote from the base 24 a screw thread 28 is provided. As shown in FIGS. 1 and 3, first and second channels 30 and 32, respectively, are formed in the annular wall 26, with one channel 30 on one side of the wall 26 and the other channel 32 on the diametrically opposite side thereof. Each of the channels 30 and 32 extend for the full length of the wall 26, being substantially perpendicular to the base 24, and has a rectangular cross section, as indicated in dotted lines in FIG. 1, with a respective centrally located circular portion 34 and 36. An internal passageway 38 in the base 24 provides communication between channel 30 and the cylindrical space 40 formed by the internal cylindrical surface of the annular wall 26. A similar internal passageway 42 in the diametrically opposite side of the base 24 provides communication between channel 32 and the cylindrical space 40.

The H-shaped cover member 20 includes a first circular plate 44 that extends over the full width of the end of the cup-shaped member 18 remote from the base 24. A central portion 46 of the plate 44 is perforated to allow communication therethrough with the cylindrical space 40, the remainder of plate 44 being imperforate. Formed integrally with the first circular plate 44 is a cylindrical member having a first cylindrical portion 48 that extends perpendicularly from plate 44 into the cylindrical space 40 formed by the annular wall 26, and a second cylindrical portion 50, the wall of which is perforated that extends in the opposite direction from the plate 44, coaxially with the first cylindrical portion 48. The first cylindrical portion 48 is provided with external screw threads 52 that are adapted for mating engagement with the screw threads 28 on the internal surface of the annular wall 26, and thereby for fixedly attaching the H-shaped member 20 to the cup-shaped member 18 with the first circular plate 44 in tight engagement with the end surface of the annular wall 26.

A second circular plate 54 is fixedly attached, as by welding, to the end of the second cylindrical portion 50. The second circular plate 54 is imperforate and has a diameter that is approximately the same as that of the first circular plate 44. Contained in the annular space that is formed between the first circular plate 44 and the second circular plate 54 is a cooling device 56. The cooling device 56, which also serves a gas filtering purpose, may be formed by an annular, spiral wrapping of wire screen.

The inlet opening of the crash bag 12 is fixedly attached in gas tight manner by a retaining ring 58 to the base 24 of the support housing structure 14, the retaining ring 58 being suitably bolted to the base 24. The crash bag 12 may be made of neoprene coated rib stock nylon sheet, the seams of which are sewed and sealed with silicone rubbers. The crash bag 12 may be porous so that it may become deflated shortly after its intended function has been accomplished. Other materials, such as polyesters, may be used for the manufacture of the crash bag 12, if desired.

The cover 16 for the crash bag 12 may be made of a suitable plastic and retains the crash bag 12 in its folded, stored state against the exterior surface of the support housing structure 14. Cover 16, if desired, may also be attached to the base 24 by retaining ring 58. Preferably, however, cover 16 may be made to fit over the retaining ring 58 and the bolt means of attachment therefor and may be attached to the peripheral edge of the base 24 by a suitable adhesive thereby to provide an enviromental seal for the inflatable restraint system 10.

Gas generant pellets 60 which may comprise sodium azide or other compositions, as described hereinbefore, are contained within the cylindrical space 40 formed by the internal surface of the annular wall 26 of the cup-shaped member 18, being retained therein by the perforated portion of the first circular plate 44.

For activating the gas generant pellets 60, there is provided in the respective circular portions 34 and 36 of the channels 30 and 32 booster charges of boron potassium nitrate 62 and 64, stab primers 66 and 68 and cylindrical firing pins 70 and 72. Each of the firing pins 70 and 72 is an inertial mass that initially is spring biased away from the respectively associated stab primer until subjected to the deceleration accompanying a crash. The firing pins 70 and 72 desirably may be made of high density depleted uranium in order to maximize the energy imparted to the primer during a crash. While firing pins 70 and 72 made of steel should be adequate, the higher the mass the better.

As seen in FIG. 4, the means for spring biasing or loading the firing pin 72 away from the stab primer 68 comprise a pair of over-center helical springs 74 and 76 which extend in opposite directions from the firing pin 72 into the opposed rectangular regions of the channel 32. With this arrangement, when sufficient deceleration is experienced for a finite time, the firing pin 72 is actuated over-center toward the stab primer 68. The helical springs 74 and 76 then assist the inertial force acting on the firing pin 72 to augment the energy of the firing pin 72 as it strikes the primer 68. A similar over-center helical spring arrangement is provided for loading the firing pin 70 away from the stab primer 66.

Upon the occurrence of a collision and resulting actuation of the firing pins 70 and 72, the primers 66 and 68 respectively associated therewith are fired. This results in ignition of the booster charges 62 and 64 and transfer of the flames produced thereby through the respectively associated passageways 38 and 42 to the gas generant pellets in the cylindrical space 40. The gases that are rapidly generated pass through the perforations in the first circular plate 44, through the perforations in the wall of the second cylindrical portion 50, and diffuse radially in all directions through the annular cooling device 56 into the crash bag 12 inflating the latter.

Thus, there has been provided an improved vehicle inflatable restraint system comprising a self-contained crash bag and inflator with built-in collision sensor, and hence, which requires no connections to external sensors for initiating inflation of the crash bag responsively to the occurrence of a collision.

What is claimed is:

1. Structure for the inflation of inflatable protective bags for safety systems for vehicles, comprising, in combination:

a cup-shaped member having a substantially flat base and including an annular wall attached to said base, being generally perpendicular thereto, and forming a cylindrical opening therein, said wall having a screw thread formed on the inner surface thereof remote from said base and having at least one channel formed therein extending for substantially the full length of said wall in a direction generally perpendicular to said base, passageway means in said base providing communication between said channel and said cylindrical opening, stab primer and booster charge means located in said channel adjacent said base, inertial firing pin means located in said channel separated from said percussion and booster charge means, over-center spring means normally holding said firing pin means out of contact with said percussion and booster charge means but operative, when subjected to deceleration in the direction of said base accompanying a crash, to move over center thereby to effect actuation of said firing pin means toward and into contact with said percussion and booster charge means, cover means for covering the end of said annular wall remote from said base including a first substantially flat plate having an imperforate circumferential edge portion of size sufficient at least to close said channel and having a central portion with peforations therein, said central portion enclosing said cylindrical opening of said wall means to form a reaction chamber and to retain combustible gas generant means therein, said cover means further including first and second cylindrical portions extending substantially perpendicularly in opposite directions from said first plate with said first one of said cylindrical portions extending into said cylindrical opening of said wall means, said first one of said cylindrical portions having external screw threads thereon adapted for mating engagement with the screw threads formed on the inner surface of said opening, and said second cylindrical portion having perforations therein, a second substantially flat plate covering the end of said second cylindrical portion remote from said first plate, said second plate being imperforate and having a circumferential flange extending beyond the perimeter of said second portion to define, with said second cylindrical portion and said first plate, an annular space, heat sink screen means provided in said annular space, and crash bag means having an opening with said opening attached in gas tight relationship with said base, with said cup-shaped member, cover means and said second flat plate extending therein, said perforations in said first plate and in said second cylindrical portion providing openings for the outlet flow of generated gases through said heat sink screen means into said crash bag means.

2. Structure as defined in claim 1 wherein said base of said cup-shaped member is circular and includes a flange portion and further including a retaining ring, and wherein said opening of said crash bag means is retained in gas tight relation between said retaining ring and said flange portion of said base.

3. Structure as defined in claim 1 wherein said crash bag means when in undeployed state is folded on said cup-shaped member, cover means and second plate, and further including a plastic cover over said structure including said crash bag means, said plastic cover being connected in gas tight relation to said base of said cup-shaped member.

4. Structure as defined in claim 3 wherein said plastic cover is adhesively sealed to said base thereby to provide an environmental seal therefor.

* * * * *